(12) United States Patent
Mabru et al.

(10) Patent No.: US 6,612,092 B1
(45) Date of Patent: Sep. 2, 2003

(54) WALL STRUCTURE WITH IMPROVED STRENGTH

(75) Inventors: Thierry Edmond Sylvestre Mabru, Reims (FR); Jean-Luc Albert Reis, Witry les Reims (FR)

(73) Assignee: Societe d'Etudes et de Constructions Aero-Navales, Gennevilliers (FR)

(*) Notice: Subject to any disclaimer, the term of this patent is extended or adjusted under 35 U.S.C. 154(b) by 0 days.

(21) Appl. No.: 09/249,014

(22) Filed: Feb. 12, 1999

(30) Foreign Application Priority Data

Feb. 26, 1998 (FR) .............................. 98 02349

(51) Int. Cl.⁷ .............................................. E04C 2/32
(52) U.S. Cl. ................ 52/789.1; 52/404.1; 52/630; 52/404.3; 52/404.2; 52/783.15; 52/783.19; 52/794.1; 52/798.1; 52/574; 52/406.11; 161/111; 161/112; 181/34; 156/213
(58) Field of Search ................ 52/404.1, 630, 52/783.15, 783.19, 789.1, 794.1, 798.1, 69, 574, 406.2, 404.3, 404.2; 161/111, 112; 156/213; 181/34; 428/33, 593, 594, 604

(56) References Cited

U.S. PATENT DOCUMENTS

| | | | | |
|---|---|---|---|---|
| 1,241,685 A | * | 10/1917 | Van Dorn .................. 105/410 |
| 2,144,045 A | * | 1/1939 | Sutton .......................... 220/71 |
| 2,144,945 A | * | 1/1939 | Sutton .................... 220/560.06 |
| 2,298,001 A | * | 10/1942 | Fay ............................. 38/137 |
| 2,391,997 A | * | 1/1946 | Noble ........................ 244/119 |
| 3,196,763 A | * | 7/1965 | Rushton ...................... 404/19 |
| 3,256,669 A | * | 6/1966 | Seiwert ....................... 52/630 |
| 3,911,843 A | * | 10/1975 | Stowell .................. 29/890.042 |
| 4,203,268 A | * | 5/1980 | Gladden, Jr. et al. ........ 428/116 |
| 4,304,821 A | * | 12/1981 | Hayase et al. ................. 156/79 |
| 4,411,121 A | * | 10/1983 | Blacklin et al. ............... 52/630 |
| 4,559,274 A | * | 12/1985 | Kloppe et al. ............. 264/45.3 |
| 4,587,153 A | * | 5/1986 | Sella ............................ 28/163 |
| 4,700,445 A | * | 10/1987 | Raskin .................. 29/890.039 |
| 4,965,138 A | * | 10/1990 | Gonzalez ..................... 428/593 |
| 5,115,621 A | * | 5/1992 | Kobayashi .................... 52/630 |
| 5,244,745 A | * | 9/1993 | Seksaria et al. ............. 428/593 |
| 5,330,093 A | * | 7/1994 | Bottomley et al. ......... 228/157 |
| 5,366,787 A | * | 11/1994 | Yasui et al. .................. 228/157 |
| 5,377,514 A | * | 1/1995 | Robbins et al. ............... 109/75 |
| 5,451,015 A | * | 9/1995 | Cronkhite et al. | |
| 5,692,881 A | * | 12/1997 | Leibfried ..................... 228/157 |
| 5,715,644 A | * | 2/1998 | Yasui ......................... 228/157 |
| 5,744,252 A | * | 4/1998 | Rasky et al. ............. 228/122.1 |
| 6,138,898 A | * | 10/2000 | Will et al. .................. 228/157 |
| 6,139,974 A | * | 10/2000 | Atkinson et al. ............. 29/521 |
| 6,276,044 B1 | * | 8/2001 | Ragland et al. ............... 29/521 |

FOREIGN PATENT DOCUMENTS

FR    1516513    3/1967

\* cited by examiner

Primary Examiner—Carl D. Friedman
Assistant Examiner—Christy M. Green
(74) Attorney, Agent, or Firm—Leydig, Voit & Mayer, Ltd.

(57) ABSTRACT

A wall for making tanks includes two superimposed plates connected to each other at respective spaced apart connected points distributed on a surface of the plates, at least one of the two plates, between respective connecting zones, bulging outward, so that separation between the two plates increases in every radial direction with distance from each connected point to a maximum separation midway between neighboring connected points. The wall has a quilted appearance.

11 Claims, 2 Drawing Sheets

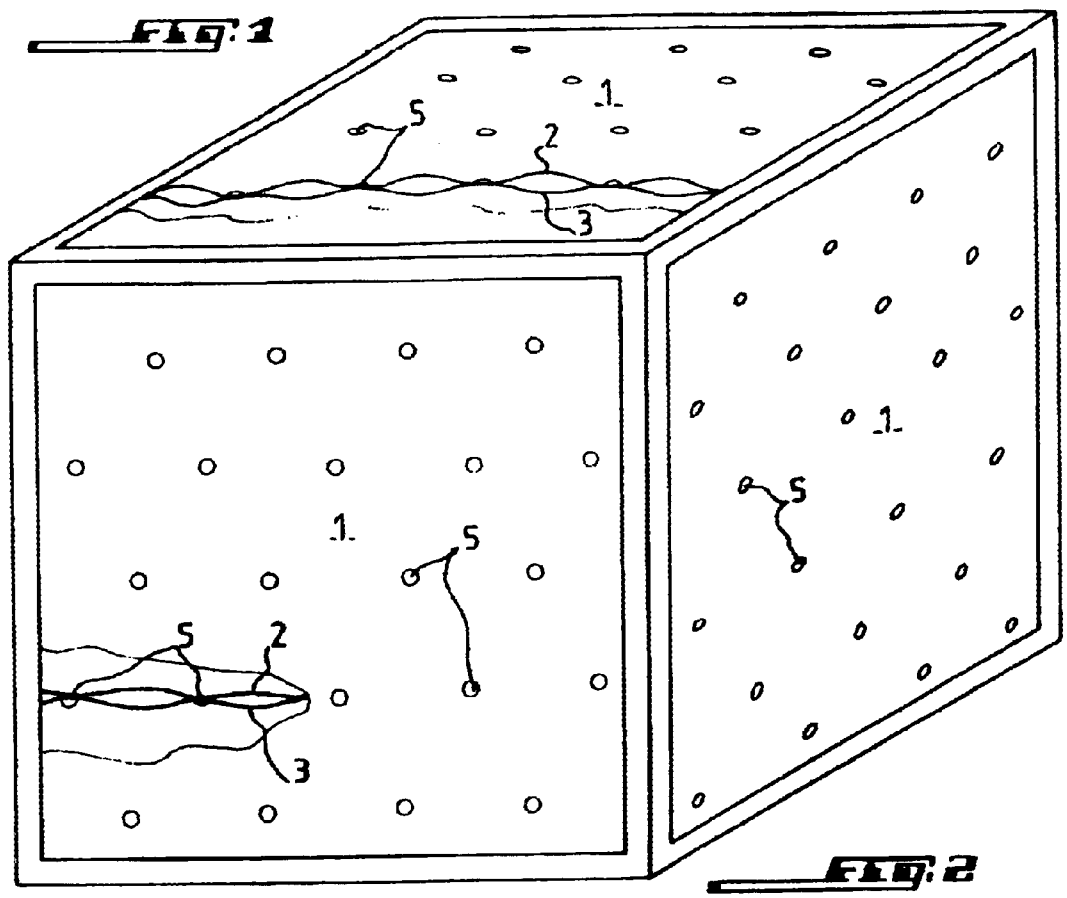
Fig. 1
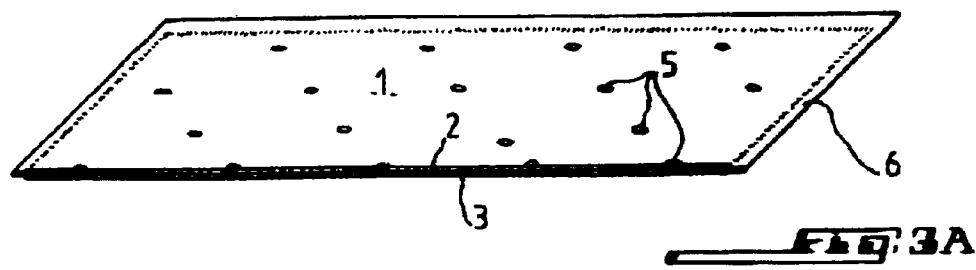
Fig. 2
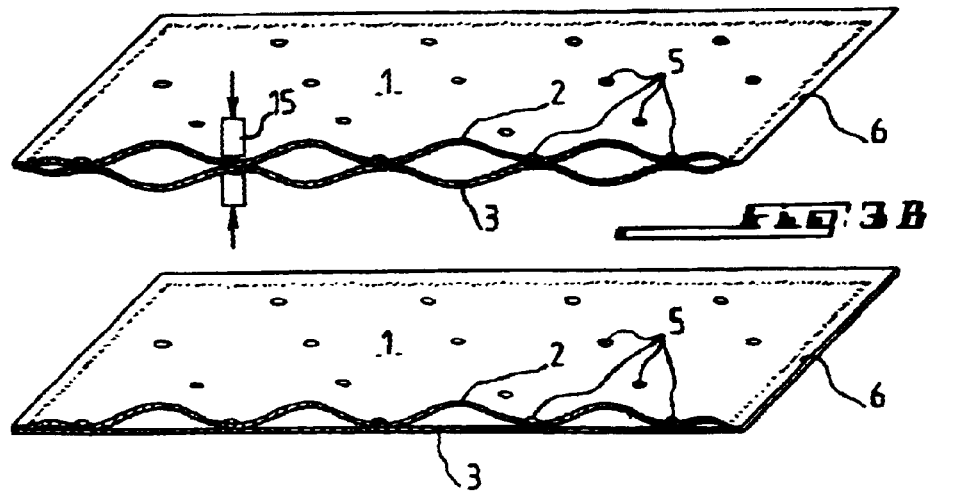
Fig. 3A
Fig. 3B

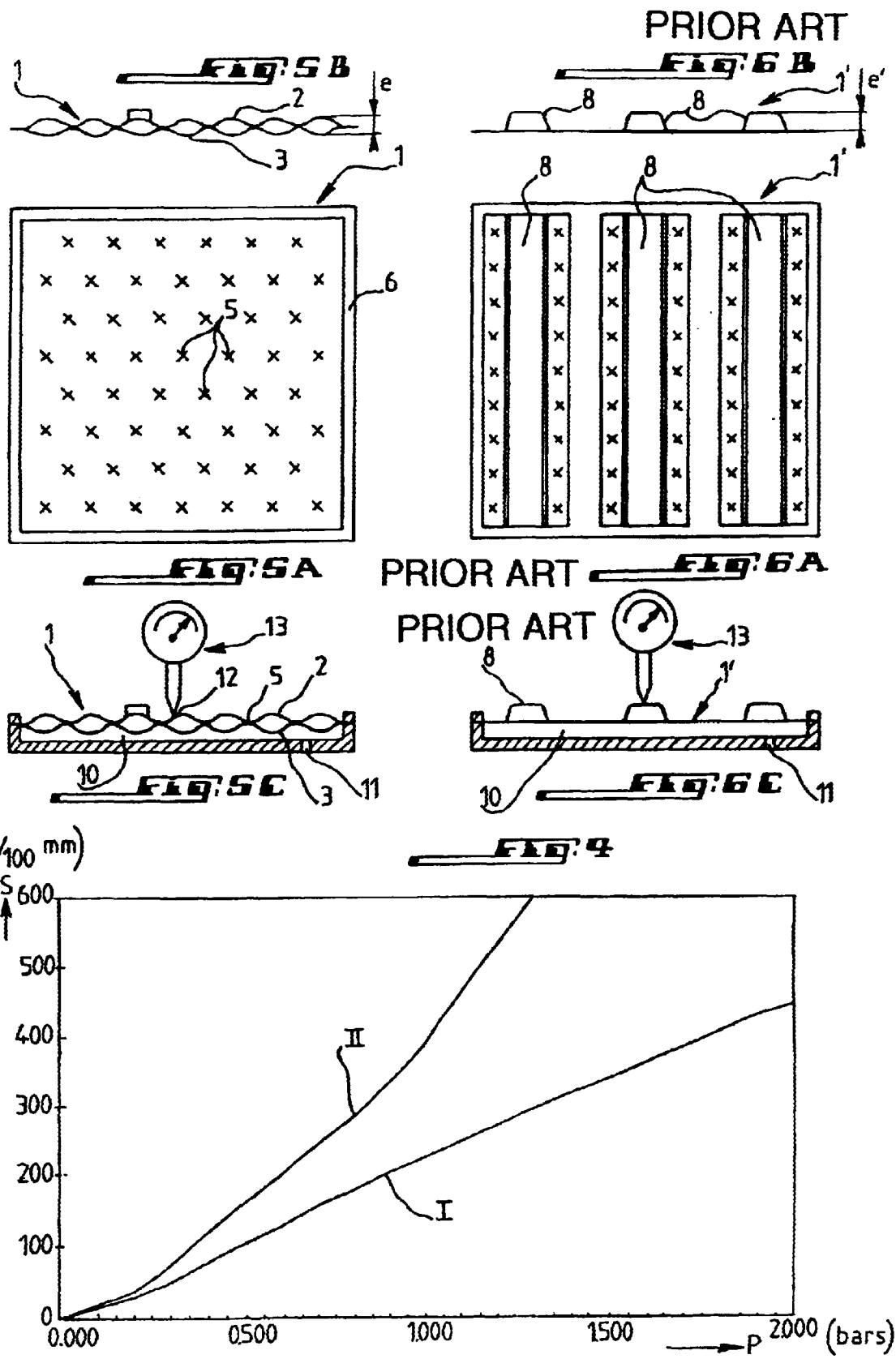

WALL STRUCTURE WITH IMPROVED STRENGTH

FIELD OF THE INVENTION

The invention relates to a wall, either metallic or not, particularly for aeronautical structures, such as seal-tight tanks, and to a method for making such a wall.

BACKGROUND OF THE INVENTION

There is nowadays found an increasing need, in particular for producing parallelepiped tanks in the aeronautical field, of having wall components with an important stiffness in a plurality of different directions. To meet with these requirements, it is known to use sheets that are reinforced by profiled members, typically in an Ω shape, that are placed in a parallel way or in a crossed configuration.

These walls have a main drawback in that they have an important thickness, which decreases the useful space when related to tanks made by assembling such walls, and in that they have nevertheless an insufficient mechanical strength when they are exposed to high stresses due to a discontinuity in their moment of inertia, caused by an alternation of the profiled members and base surface alone.

PURPOSE AND SUMMARY OF THE INVENTION

The purpose of the present invention is to provide a wall which overcomes the drawbacks of known walls.

For reaching the above purpose, a wall according to the invention is characterized in that it comprises two plates which are connected, in connecting zones, to predetermined places that are distributed on their surfaces, and in that portions of at least one plate, placed between the connecting zones, are outwardly bulged.

According to one feature of the invention, the connecting zones are made by spot welding, ultrasound welding, gluing, brazing, riveting, and the like.

According to one feature of the invention, edges of the plates are connected for forming zones for fixing the wall to a support structure.

According to another feature of the invention, stiffness of the wall is variable by a choice of a number and spacing of the connecting zones and/or a choice of a degree of bulging of the plate.

According to still another feature of the invention, an interval between the walls is filled with a product of specific properties, such as a thermally or acoustically isolating product or a non-inflammable product, or a mechanically suitable product.

The method for making such a wall is characterized in that a bulging of the plates between the connecting zones is made through injection between the plates of a pressurized fluid.

According to another feature of the invention, connection of the plate is made by spot welding, ultrasound welding, gluing, brazing, riveting and the like.

BRIEF DESCRIPTION OF THE DRAWINGS

Further features and advantages of the present invention will become apparent from the following detailed description of some currently preferred embodiments thereof, illustrated only by way of non limited examples in the accompanying drawings, wherein:

FIG. 1 shows a tank made from metallic walls according to the present invention;

FIG. 2 is a cross sectionnal view of a wall according to the invention before the inflating operation;

FIGS. 3A and 3B are views similar to FIG. 2, but showing the wall in an "inflated" state in two different embodiments;

FIG. 4 shows two curves respectively illustrating the distortion of a wall according to the invention, and of a known wall with respect to the distorting pressure exerted on the wall;

FIGS. 5A, B and C show a wall according to the invention in an elevation view and a cross sectionnal view, respectively, as well as the measuring device which is used for obtaining the curve I shown in FIG. 4;

FIGS. 6A, B and C are views similar to those of FIG. 5, of a known wall, for obtaining the curve II of FIG. 4.

DETAILED DESCRIPTION OF PREFERRED EMBODIMENTS

Referring now to the drawings, FIG. 1 shows, as an example, a parallelepiped tank made by an assembling of walls according to the invention. As this is already shown in this figure and more particularly in FIGS. 2 and 3A, 3B, a wall according to the invention is made by a superposition of two plates, for example sheets of aluminum alloy 2 and 3 connected together in connecting zone 5 shown in the drawing as spots, for example welding spots, and the edges of which are soldered in a seal-tight manner in order to obtain edges 6 for providing a mounting of the walls on a support structure.

Then, the plates 2 and 3 are distorted, advantageously through injection of a pressurized fluid, typically a pressurized liquid, in the interval delimited between the plates 2 and 3, so that the portions of the plates 2 and 3 placed between the connecting zones 5 are bulged. There is thus obtained a double walled structure that is "alveolated" or "matelassée". The bulging rate, i.e. the maximal spacing of the plates 2 and 3 between the connecting zones is variable through a variation in pressure of the injected fluid and a variation in the forming tooling that is used. Obviously, distribution and arrangement of the connecting zones on a surface of the composite wall are also variable.

The composite walls according to the invention may be made as plane or warped plates. It suffices therefor to position superimposed performed plates, upon "inflation", in a form having an inner interval which is arcuate in a corresponding way and delimited by faces that are spaced each other by a distance equal to the thickness that is desired for the wall.

As shown in FIGS. 3A and 3B, only one or both of the two plates can be distorted and have bulged portions.

FIG. 4 shows a comparison of the mechanical properties of an alveolated composite wall according to the invention, such as diagrammatically shown in FIGS. 5A and 5B, with those of a conventional wall of a type shown in FIGS. 6A and 6B, i.e. made of a metallic plate on which are added Ω shaped profiled members shown at 8.

FIG. 4 shows the distortions of the plates with respect to mechanical stresses exerted thereon. The measuring devices that are used for this purpose are shown in FIGS. 5C and 6C. The respective measuring devices are obviously identical. The plate according to the invention is shown at 1 (FIG. 5C) and the conventional plate is shown at 1' (FIG. 6C). In these measuring devices, the walls are encased along their four sides, and a pressure is applied on the surface of each sample wall 1, 1'. For this purpose, the interval beneath the wall is made as a pressure chamber 10, and a pressurized fluid is introduced in the chamber 10 through an aperture 11.

Displacement of the wall at the center thereof shown at 12 is then measured by a measuring apparatus diagrammatically shown at 13 in the two FIGS. 5C and 6C.

In FIG. 4, the values S of the displacement are plotted as ordinates and the pressures P as abscissas. The curve I shows the displacement of the wall 1 according to the invention, and the curve II that of a conventional wall 1'. The wall 1 according to the invention has a thickness e (FIG. 5B) that is equal to 80% of the thickness e' of the conventional wall. Sizes of the samples 1 and 1' are 300 mm×300 mm.

FIG. 4 shows that despite the above mentioned important difference concerning the thicknesses, the alveolated wall according to the invention has a stiffness that is substantially greater (about 50%) than that of the conventional wall. Moreover, while the conventional wall will be broken at a pressure of about 1.2 bars, the wall according to the invention will still withstand to a pressure of 2 bars, the curve keeping always a linear aspect.

Such a surprising difference between behaviors of the two walls may be explained by the fact that the composite wall according to the invention does not have any abrupt discontinuities on it surface, while, in the conventional wall, the Ω shaped profiled members will cause obvious discontinuities in the moment of inertia on the wall surface.

It results from the preceding disclosure that the mechanical features of a composite wall made according to the invention are substantially greater than those of conventional walls. Due to the fact that, for having similar stiffnesses, the alveolated wall according to the invention may have a thickness that is much smaller than that of a conventional wall, the use of walls according to the invention, for example in making tanks, is very advantageous. Actually, for identical outer sizes, a tank made from the walls according to the invention will have a useful volume that is substantially greater than that of a tank made from conventional walls.

Obviously, the advantage of the walls according to the invention is not limited to seal-tight structural tanks, but may be used in any fields involving a use of seal-tight walls which are mechanically resistant to high mechanical forces, while providing a minimum space requirement. The possibility of filling the inner interval of the wall according to the invention with a suitable product enables to make walls that have for example thermically or acoustically isolating properties, are non-inflammable or are mechanically reinforced. The filling product could for example be an incompressible resilient material. On an other hand, the possibility of modifying both the arrangement of the welding spots and the degree of bulging of the plates, makes that the walls according to the invention may be adapted to specific conditions of use.

Obviously, the plates could be made of any suitable materials, either metallic or non metallic materials, and the connecting zones could be obtained according to any suitable process, for example by spot welding, ultrasound welding, gluing, brazing, riveting and the like.

It should be noted that the assembling of the two plates by gluing has an advantage in that there is thus obtained a true double walled structure, that is particularly suitable for a manufacture of tanks needing, for safety purposes, two independent envelopes.

In this respect, aircrafts make use of aeronautical tanks which comprise an inner bladder that contains a liquid and which is suspended in an outer envelope fastened to the structure of the aircraft and resting on a floor. The interval between the bladder and the outer envelope communicates with the outside so that, in case of cracks, leakages which could be produced are evacuated to the outside.

The above mentioned heavy and bulky structure, which is relatively difficult and time consuming to mount, can be sustituted by a tank having walls which are formed by walls according to the invention, with a gluing connection. Actually, in this case, each plate remains independent, and a formation of cracks in the inner wall is limited to this inner wall. Possible leakages will then come into the interval between the two plates from which they could be evacuated to the outside. Another advantage of a gluing connection is that the glue is placed in the median plane of the wall where the stresses are minimal, or even nearly nil.

On an other hand, in order that the connecting zones be not too much mechanicaly stressed upon distortion of the plates through injection of a pressurized liquid, the connecting zones are encased between two pressing studs 15 as this is diammagratically shown in FIG. 3A. Maintaining the connecting zones upon formation of the matelassée structure is preferably used also in the case of assembling the plates by welding.

It should also be noticed that the plates can be made of homogeneous or heterogeneous materials, and that the mean lines of distribution of the connecting zones may have any suitable and desired geometrical shape, such as a circular or linear shape. Concerning the inflating process, it can be made at ambiant temperature, or after heating of the plates.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A wall structure for making tanks, the wall structure comprising two superimposed plates connected to each other at respective spaced apart connecting points distributed in an array on a surface of the plates, at least one of the two plates, between respective connecting points, bulging outward, separation between the two plates in every radial direction from each connecting point continuously increasing with distance from each connecting point toward a neighboring connecting point, to a maximum separation midway between pairs of neighboring connecting points, the wall having a quilted appearance.

2. The wall structure as set forth of claim 1, wherein the plates are connected at the connecting points by one of welds, an adhesive, and a brazing material.

3. The wall structure as set forth in claim 1, wherein the two plates have respective edges that are continuously joined as fixation edges for mounting the wall on a support structure.

4. The wall structure as set forth in claim 1, wherein the two plates are selected from the group consisting of metallic and non-metallic materials.

5. The wall structure as set forth in claim 4, wherein the two plates are selected from the group consisting of homogeneous and heterogeneous materials.

6. A tank comprising a first volume enclosed within a second volume with a third volume between the first and second volumes, wherein a wall structure of the tank defines the first, second, and third volumes and comprises two superimposed plates connected to each other at respective spaced apart connecting points distributed in an array on a surface of the plates, at least one of the two plates, between respective connecting points, bulging outward, separation between the two plates in every radial direction from each connecting point continuously increasing with distance from each connecting point toward a neighboring connecting point, to a maximum separation midway between pairs of neighboring connecting points, the wall structure having a quilted appearance, the first volume being defined by an inside one of the two plates and for containing a fluid, the second volume being defined by an outside one of two plates, and the third volume being disposed between the two plates and collecting leakage of fluid from the first volume, the third volume communicating outside the tank for evacuation of leaking fluid reaching the third volume.

7. The wall structure as set forth in claim 1 wherein both of the two plates bulge outwardly between respective pairs of connecting points.

8. A tank having a wall comprising two superimposed flat plates connected to each other at respective spaced apart connecting points distributed in an array on a surface of the two plates and inflatable by injection between the two plates of a pressurized fluid to produce a quilted appearance, at least one of the two plates bulging outward after injection of the pressurized fluid, separation between the two plates, in every radial direction from each connecting point increasing continuously with distance from each connecting point toward a neighboring connecting point, to a maximum separation midway between pairs of neighboring connecting points, the wall having a quilted appearance and a variable resistance to mechanical stresses determined by locations of the connecting points in the array and pressure of the pressurized fluid.

9. The tank as set forth in claim 6 wherein both of the two plates bulge outwardly between respective pairs of connecting points.

10. The wall structure as set forth in claim 1 wherein only one of the two plates bulges outwardly between respective pairs of connecting points.

11. The tank as set forth in claim 6 wherein only one of the two plates bulges outwardly between respective pairs of connecting points.

* * * * *